(No Model.)
F. H. WERNER.
PROCESS OF MANUFACTURING BEET ROOT SYRUP.
No. 588,623. Patented Aug. 24, 1897.
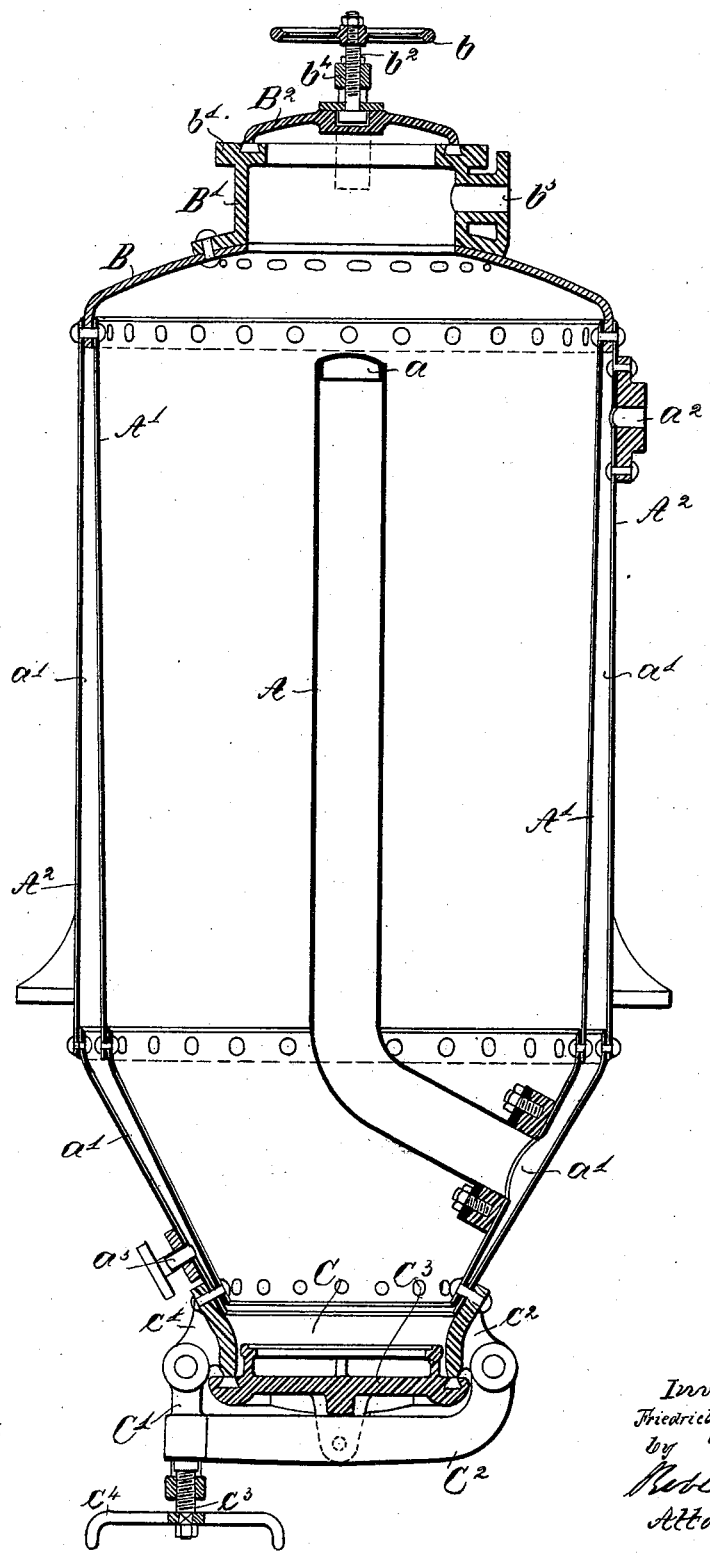
Witnesses:
Emil Kayser.
Karl Salomon.
Inventor:
Friedrich Heinrich Werner
by Robert Dieffler
Attorney.

UNITED STATES PATENT OFFICE.

FRIEDRICH HEINRICH WERNER, OF VELPKE, GERMANY.

PROCESS OF MANUFACTURING BEET-ROOT SYRUP.

SPECIFICATION forming part of Letters Patent No. 588,623, dated August 24, 1897.

Application filed June 21, 1895. Serial No. 553,591. (No specimens.) Patented in Germany March 28, 1895, No. 83,091; in Belgium June 12, 1895, No. 116,041; in Hungary February 13, 1896, No. 5,509, and in Austria December 8, 1896, No. 4,922B/46.

*To all whom it may concern:*

Be it known that I, FRIEDRICH HEINRICH WERNER, a subject of the German Emperor, and a resident of Velpke, in the Duchy of Brunswick, German Empire, have invented a new and useful Process of Manufacturing Beet-Root Syrup, (for which Letters Patent have been obtained in Germany, No. 83,091, dated March 28, 1895; in Belgium, No. 116,041, dated June 12, 1895; in Hungary, No. 5,509, dated February 13, 1896, and in Austria, No. 4,922B/46, dated December 8, 1896,) of which the following is an exact specification.

This invention relates to an improved process of manufacturing syrup from beet-roots; and in order that my improvement may be more fully understood and appreciated I think it well first to describe the method generally employed up to now and the drawbacks adhering to the same.

The beet-roots after having been reduced or chopped are introduced, with an addition of some water, into a diffusing apparatus, such as used for the production of sugar, and are boiled by means of steam led first through a serpent-pipe arranged upon the bottom of said apparatus and allowed thereafter to escape directly into said apparatus. The boiled beet-roots are then removed from the said apparatus, squeezed, and separated from the liquor, and the juice resulting therefrom is inspissated either in open pans or in vacuum-pans or in any other suitable evaporating apparatus. There results from the steam introduced into the mixture of beet-roots and water a rather great quantity of water of condensation, which, as a matter of course, remains with the juice. Said water of condensation contains, however, also boiler-water and oil, which both have been carried over into the diffusing apparatus by the streaming steam. The quality of the juice is greatly impaired by said mixture of water of condensation, boiler-water, and oil, and the juice may become directly injurious to health if the quantity of said mixture is an uncommonly great one.

The greatest drawback of the process above described resides, however, in the dissolution and decomposition of the alkalies contained within the beet-roots in comparatively great quantities. The disadvantageous properties of the juice are greatly increased thereby, and the first part of the juice must, in fact, be let off to render the other or main part useful. There is thus, as a matter of course, a corresponding loss in the yield, and the syrup gained has not only generally a dark color, but oftentimes an empyreumatic taste, too, and is very liable to ferment. Furthermore, the costs of inspissating the juice are great in that also the water of condensation formed during the cooking of the beet-roots is to be evaporated. In the whole, much steam and fuel are necessary to carry that older method through.

Having now described the essential points of said method, I will proceed to describe my improved one, and in order that the same may be better understood I have annexed a sheet of drawings showing a vertical section through a novel apparatus which I make use of in carrying my invention into practice.

Said apparatus consists of a double-walled vessel the two walls $A'$ $A^2$ of which form an annular space $a'$. The latter communicates with the interior of a bent tube A, fixed at its lower end to the wall $A'$ and closed at its top by a cap $a$. Said walls are at their upper rims riveted to a curved top plate B, carrying a head-piece B', with a cover or lid $B^2$. The latter may be pressed upon said head-piece by means of the screwed spindle $b^2$, which is furnished with a hand-wheel $b$ and is held by a bow $b^4$, the ends of which are formed into a sort of hook and take below a flange $b'$ of the head-piece B'. At their lower rims the said walls $A'$ $A^2$ are riveted to an annular bottom piece or ring C, provided with two projections $c'$ $c^2$, situated diametrically opposite to each other. The projection $c'$ serves as a bearing for a bow C', carrying a screwed spindle $c^3$, with a hand-lever $c^4$. Said spindle supports the free end of a lever $C^2$, fulcrumed to said projection $c^2$ and carrying the loose bottom proper, $C^3$.

The outer wall $A^2$ of the vessel has an inlet $a^2$ for the steam and an outlet $a^3$ for the water of condensation. The head-piece B' has an outlet $b^3$ for the steam evolved within the vessel.

After the beet-roots have been cleansed they are in their unreduced or unchopped state introduced through the head-piece B' into the vessel, or upon the bottom $C^3$ and into the annular space between the tube A and the wall A', respectively. Steam is now caused to pass into and through the space $a'$ until the beet-roots are perfectly cooked. The vapors evolved by the beet-roots are sucked off through the channel $b^3$ by means of a suitable pump. Said vapors are very bitter, as well as caustic, in that they contain nearly all the dung-stuffs that were accumulated in the peels of the beet-roots. As soon as the cooking of the beet-roots is finished the latter are removed from the apparatus and turned into a pulp, which then is exposed to a strong pressure, so as now to gain the juice. This syrup produced from that juice in known manner possesses a color resembling that of gold and is of so fine a quality that it may well be regarded as a dainty.

The main features of my improved process reside in preventing the beet-roots from coming in contact with the steam employed for cooking them and in removing the vapors evolved by the beet-roots while being cooked.

The filtration and evaporation of the juice proceed very easily. The latter inspissates quickly, forms no scum, and does not flow over the rim of the pan. Its resistibility against fermentation is quite considerable, as has been proved by continued trials.

Having thus fully described the nature of my invention, what I desire to secure by Letters Patent of the United States is—

The method of producing a syrup out of beet-roots, consisting in boiling the latter under atmospheric pressure by means of steam without bringing them in contact with the same, and removing during that time the vapors as they are evolved by said beet-roots; turning the latter after the boiling into a pulp, pressing said pulp, and inspissating the juice so attained, substantially as described.

In testimony whereof I have signed this specification in the presence of two subscribing witnesses.

FRIEDRICH HEINRICH WERNER.

Witnesses:
JULIUS SECKEL,
AGNES KELLY TINGLE.